3,450,690
PREPARATION OF ALKALI-STABLE ALKYL GLUCOSIDES

John P. Gibbons, Western Springs, and Lawrence Wondolowski, Lemont, Ill., assignors to Corn Products Company, New York, N.Y., a corporation of Delaware
No Drawing. Filed Dec. 23, 1966, Ser. No. 604,187
Int. Cl. C08b 19/00
U.S. Cl. 260—210                                        7 Claims

ABSTRACT OF THE DISCLOSURE

The present invention relates to a method for the removal of alkali labile color-producing bodies from crude alkyl glucoside products. Crude alkyl glucoside in aqueous solution is subjected to a temperature in the range from about 50° C. to about 200° C. at a pH of at least 8 for a sufficient period of time to permit conversion of the impurities in the crude solution to a readily separable form. The impurities are then separated from the solution, resulting in an aqueous solution of alkali-stable alkyl glucoside.

---

The present invention relates to a method for the removal of alkali labile color-producing bodies from crude alkyl glucoside products. More particularly, the present invention relates to the treatment of crude alkyl glucoside products with alkali to yield an alkali-stable glucoside product.

Alkyl glucosides are any sugars or polysaccharides which have been reacted with a mono- or polyhydric alcohol to produce an alkyl or a hydroxyalkyl glucoside. Suitable carbohydrates for preparation of the substituted glucosides include monosaccharides such as the pentoses and hexoses, disaccharides such as sucrose and maltose, and polysaccharides such as starch and cellulose. The preparation of alkyl and hydroxyalkyl glucosides is well known. The most common procedure for preparing the alkyl glucosides involves the reaction of the saccharide with a monohydric alcohol or polyhydric alcohol in the presence of a suitable acidic catalyst.

The alkyl glucosides to which the present invention apply are those made with monohydric aliphatic alcohols containing 1 to 8 carbons in their aliphatic chains and hydroxyalkyl glucosides made with polyhydric alcohols. During preparation of an alkyl glucoside, by-products are produced which render the alkyl glucoside alkali-labile. When the crude alkyl glucoside is subsequently involved in a reaction where in alkali is present, a dark color is formed. Previous attempts to render the crude alkyl glucoside alkali-stable have failed.

It is an object of the present invention to render a crude alkyl glucoside alkali-stable.

It is another object of the present invention to provide a process for removal of color forming bodies from a crude alkyl glucoside.

Another object of the present invention is to provide a process for producing an alkyl glucoside which is substantially water soluble and which upon being placed in solution in the presence of alkali provides a clear, colorless solution.

Other objects of the present invention will be apparent hereinafter from the following description and from the recitals of the appended claims.

The present invention provides a process for preparing an alkali-stable alkyl glucoside which comprises treating an aqueous solution of a crude alkyl glucoside with alkali at a pH of at least about 8 and at a temperature between about 50° C. and about 200° C., and removing the by-products produced by the treatment to yield an alkali-stable alkyl glucoside.

In accordance with the present invention, it has been found that an alkali-stable alkyl glucoside can be produced by treating an alkali-labile crude alkyl glucoside with alkali at an elevated temperature for a period of time sufficient to substantially destroy the residual reducing sugar content. The alkali treatment results in decomposition of the color-forming bodies in such a manner that the decomposition products are subsequently easily separated from the alkyl glucoside.

The alkyl glucosides with which the present invention is concerned include alkyl glucosides produced by reaction of a saccharide with a monohydric alcohol having 1 to 8 carbons and hydroxyalkyl glucosides produced by reaction of a saccharide with a polyhydric alcohol. Suitable monohydric alcohols include, for example, methyl alcohol, ethyl alcohol, propyl alcohol, butyl alcohol, amyl alcohol, 2-ethylhexyl alcohol and octyl alcohol. Suitable polyhydric alcohols used to produce the hydroxyalkyl glucosides include, for example, ethylene glycol, propylene glycol, butylene glycol, and glycerol.

Suitable carbohydrates for preparation of the substituted glucosides are, for example, monosaccharides such as the four different pentoses and the ten different hexoses, disaccharides such as sucrose and maltose, and polysaccharides such as starch and cellulose.

Acidic materials suitable for the catalysis of the glucoside reaction include strong mineral acids such as hydrochloric acid, sulfuric acid, phosphoric acid, and boron trifloride; strong organic acids such as benzene sulfonic acid, toluene sulfonic acid, trichloroacetic acid, and oxalic acid; and strong cation resins such as, for example, a sulfonated cross-linked polystyrene ion exchange resin in the acid form.

To carry out the present invention, crude alkyl or hydroxyalkyl glucosides are treated with alkaline reagents such as potassium hydroxide, sodium hydroxide, sodium methylate, calcium oxide, calcium hydroxide, barium oxide, barium hydroxide, barium methylate, lithium hydroxide or strong amine bases at elevated temperatures for short periods of time. Preferably, after treatment with the alkali at the elevated temperature, any non-glucoside products present are then removed by filtration, chemical treatment, ion exchange resin treatment, a combination of treatments, or the like. The resulting alkyl glucoside exhibits excellent color stability on boiling in aqueous solutions with strong alkali.

The amount of alkali reagent necessary to practice the present invention should be sufficient to maintain an alkaline pH of at least about 8 and also sufficient to neutralize any acidic by-products formed during the alkali treatment. The preferred pH is between about 10 and about 12. Although the alkaline reagent will slowly reduce or remove the alkali-labile color-producing bodies from the crude alkyl or hydroxyalkyl glucosides under ambient conditions, it is preferred to carry out the treatment at temperatures in the range of 50° C. to 200° C., preferably between about 85° C. and 175° C. for short periods of time. The higher the temperature the shorter the heating cycle required to reduce or remove the alkali-labile color-producing bodies present in the crude alkyl glucoside.

The small amount of by-products remaining in the crude alkyl or hydroxyalkyl glucosides after the alkali treatment can be separated by precipitation as insoluble compounds and filtered off or by the use of ion exchange or both. Generally, during the alkali treatment the color-producing bodies are decomposed, and any insoluble material will separate as a precipitant. The filtrate containing the alkali-stable alkyl glucoside can then be further decolorized, if desired, by treatment with bleaching agents, such as hydrogen peroxide, or by the use of decolorizing carbons.

In the following operating examples, which illustrate the invention, all percentages and parts are by weight dry basis, and all temperatures are in degrees centigrade.

EXAMPLE I

Preparation of crude methyl glucoside

A hot solution of 10,800 parts of dextrose in 22,000 parts of anhydrous methanol was passed through a column packed with a strong cation resin which was a sulfonated cross-linked polystyrene in the acid form. The effluent from the column had a solids content of approximately 37%, a pH of 2.7 and a reducing sugar content of 2% to 4% calculated as dextrose. This methyl glucoside product was light brown in color and upon boiling a portion of the product with sodium hydroxide it turned almost completely black.

Calcium hydroxide treatment of crude methyl glucoside under reflux conditions

Another portion of the product was treated with calcium hydroxide to reach a pH of 12. The alkali-treated solution was then refluxed at 69° C. for 30 minutes. After refluxing and cooling, the treated solution was filtered. The pH at the time of filtering was 12. After filtration, the alkyl glucoside filtrate was treated with carbon and a clear solution of alkyl glucoside was obtained. The resulting product contained 20% solids and had a reducing sugar content of 0.1% on a dry basis calculated as dextrose. The solution was color stable on boiling with sodium hydroxide.

EXAMPLE II

Calcium hydroxide treatment of crude methyl glucoside at 100° C.

In a 1 liter glass flask equipped with stirrer, thermometer, and reflux condenser, was placed 500 grams of the crude methyl glucoside material obtained in accordance with Example I, and 9.1 grams of calcium hydroxide. The reducing sugar content of the solids was 17.5% calculated as dextrose. The contents were heated for 2 hours at 100° C. with agitation, cooled and filtered through a Celite bed to remove the insoluble material. The filtrate was placed on a hot plate and carbon dioxide bubbled into it until the pH became 6 to 7. The insoluble material formed was removed by filtration and the filtrate treated with activated carbon until a light yellow colored solution was obtained. This solution was color stable on boiling with sodium hydroxide and had a reducing sugar content of 0.1% calculated as dextrose.

EXAMPLE III

Barium oxide treatment of crude methyl glucoside

The process of Example II was carried out except for substitution of barium oxide for the calcium hydroxide. The temperature ranged from 80 to 100° C. and the time was 2 hours. The filtrate after treatment was heated with two parts of 50% hydrogen peroxide and 2 cubic centimeters of 28% ammonium hydroxide to further decolorize. The resulting colorless solution had a reducing sugar content on a solids basis of 0.2% calculated as dextrose. The solution upon boiling with sodium hydroxide was substantially color stable.

EXAMPLE IV

Alkali treatment of crude methyl glucoside at high temperature

To 7 liters of an aqueous solution of the methyl glucoside produced in Example I, and containing 2.1% of reducing sugars calculated as dextrose, was added 2% of calcium hydroxide based on the solid. The resulting slurry was passed through a heated tube then through a water cooled condenser at such a rate that the residence time of the solution in the heated tube was 2 to 3 minutes and the solution reached a temperature of 150° C. to 162° C. The product from this treatment after filtration to remove the insoluble material, had a reducing sugar content of 0.2% calculated as dextrose, and was color stable on boiling with sodium hydroxide.

EXAMPLE V

Preparation of crude ethyl glucoside

In a 1 liter glass flask equipped with a stirrer, thermometer, and reflux condenser, was placed 162 grams of dextrose, 826 grams of anhydrous ethanol and 76 grams of strong cation resin in the acid form. With agitation the contents were heated to reflux at 79° C. and held at reflux for 23 hours. The crude ethyl glucoside was then cooled to room temperature and the insoluble ion exchange resin removed by filtration. The unreacted ethanol was stripped off in vacuum replacing some of the alcohol removed periodically with water during the stripping operation. The resulting syrupy product was decolorized by treatment with carbon and concentrated to a solids content of 78%. This crude material had a reducing sugar content on the solids of 5.6% calculated as dextrose. A portion was drawn off and boiled with sodium hydroxide. The solution turned to an almost completely black color.

Alkali treatment of crude ethyl glucoside

Another portion of the ethyl glucoside produced, in the amount of 200 grams, was placed in an apparatus similar to that used above along with 5 grams of calcium hydroxide. The pH was 11.6. With agitation the contents were heated at 100° C. for 1 hour. After removing the insoluble precipitate by filtration, the filtrate was treated with carbon to decolorize. The resulting solution had a light yellow color and a reducing sugar content of 0.1% calculated as dextrose. This material possessed good color stability on boiling in the presence of sodium hydroxide.

EXAMPLE VI

Preparation of crude hydroxyalkyl glucoside from starch 240 parts by weight of ethylene glycol, to which 1 part of concentrated sulfuric acid had been added, were placed in a steam jacketed stainless steel reactor equipped with an agitator, reflux condenser attached to a vacuum source, and a device to record the temperature of the contents. After thorough mixing, 86 parts of corn starch was added and the contents heated under vacuum over a period of one-half hour with agitation to 140° C. After reaching the temperature of 140° C., the mixture was held at that temperature for 1 hour. The temperature was then lowered to 104° C. and held at that temperature for an additional 2 hours, then cooled to room temperature and the vacuum released. After neutralization of the acid catalyst with sodium carbonate and filtration, the product containing 32% solids, had a reducing sugar content of 2.4% on the solids calculated as dextrose. Upon heating a sample of this material at 100° C., in the presence of alkali, the solution turned from light brown to almost black in color.

Alkali treatment of crude hydroxyalkyl glucoside

Another portion of the material in the amount of 300 ml. was placed in a glass flask equipped with a stirrer, thermomenter and a reflux condenser. To this solution was added 3 grams of calcium oxide to provide a pH of 11.4. With stirring, the contents were heated to 120° C., held at that temperature for 2 hours, cooled and filtered. After decolorization with activated carbon, the reducing sugar content on the solids was 0.13%, calculated as dextrose. The solution had excellent color stability on heating with alkali at 100° C.

EXAMPLE VII

Preparation of crude alkyl glucoside from maltose

Into a 3 liter flask was placed 180 grams of malt sugar (maltose), 1600 grams of anhydrous ethanol, and 76 grams of a strong cation resin in the acid form. With agitation, the contents were heated to 79° C. and held at that temperature for 21 hours. The reaction mixture was cooled to room temperature and the insoluble ion exchange resin removed by filtration. The unreacted ethanol was removed under vacuum, replacing some of the alcohol removed with water during the stripping operation. The resulting syrupy product was decolorized by treatment with carbon and concentrated to a solids content of 72%. This material had a reducing value of 4.8% calculated as dextrose. Upon boiling a portion of the product with sodium hydroxide the solution turned almost black in color.

Alkali treatment of crude alkyl glucoside

A portion in the amount of 200 grams was placed in an apparatus similar to that used above, along with 5 grams of calcium hydroxide. The pH of the slurry was 11.6. With agitation the contents were heated to 100° C., and held there for one hour. After removal of the insoluble precipitate by filtration, the filtrate was treated with carbon to decolorize, resulting in a solution with a light yellow color and a reducing sugar content of 0.1% calculated as dextrose. The final material possessed good color stability on boiling in the presence of sodium hydroxide.

The alkali-stable alkyl glucoside of the present invention is particularly suitable for use in the production of polyethers. Heretofore, in order to remove the color bodies from the alkyl glucoside for use in polyethers, it was necessary to crystallize the alkyl glucoside away from the color bodies. Such crystallization procedures resulted in a yield loss of approximately 20% of the alkyl glucoside. In accordance with the present invention, the color bodies are removed from the alkyl glucoside solution resulting in recovery of 100% of the alkyl glucoside values.

The process of the present invention is simple and economical. The present invention affords the user a pure alkyl glucoside solution substantially free of color bodies and unstable constituents.

While the invention has been described in connection with specific embodiments thereof, it will be understood that it is capable of further modifications and this application is intended to cover any variations, uses or adaptations of the invention following, in general, the principles of the invention set forth and including such departures from the present disclosure as come within known or customary practice in the art to which the invention pertains and as may be applied to the essential features hereinbefore set forth and as fall within the scope of the invention and the limits of the appended claims.

We claim:
1. In a process for preparing an alkali-stable alkyl glucoside in liquid form, from a crude alkyl glucoside solution containing impurities that are sensitive to the presence of alkali, the improvement comprising subjecting said solution to a temperature in the range of from about 50° C. to about 200° C., at a pH of at least about 8, for a sufficient period of time to permit conversion of the impurities to a form in which they can be readily separated from the solution, removing the impurities from the solution without crystallizing out substantial amounts of alkyl glucoside, and recovering an alkali-stable alkyl glucoside in liquid form.

2. A process as defined by claim 1 wherein the pH is attained by the addition of calcium hydroxide.

3. A process as defined by claim 1 wherein the pH is from about 10 to about 12.

4. A process as defined by claim 1 wherein the period of time is in the range of from about 1 minute to about 2 hours.

5. A process as defined by claim 1 wherein said alkyl glucoside is a hydroxy alkyl glucoside.

6. A process as defined by claim 1 wherein said alkyl glucoside is methyl glucoside.

7. A process for preparing alkali-stable methyl glucoside in liquid form which comprises subjecting an aqueous solution of crude methyl glucoside, that contains impurities sensitive to the presence of alkali, to a temperature of about 100° C., at a pH of about 10, for a period of time sufficient to permit conversion of the impurities to a form in which they can be readily separated from the solution, removing the impurities from the solution without crystallizing out substantial amounts of methyl glucoside and recovering a solution of alkali-stable methyl glucoside having a reducing sugar content less than about 0.5%.

References Cited

UNITED STATES PATENTS

| | | | |
|---|---|---|---|
| 2,110,206 | 3/1938 | Davy | 260—210 |
| 2,289,006 | 7/1942 | George | 260—210 |
| 2,609,370 | 9/1952 | Gaver et al. | 260—210 |
| 3,089,814 | 5/1963 | Blaich | 260—210 |
| 3,296,245 | 1/1967 | Kaiser et al. | 260—210 |

LEWIS GOTTS, *Primary Examiner.*

J. R. BROWN, *Assistant Examiner.*